United States Patent
Bouguerra et al.

(10) Patent No.: US 12,348,474 B2
(45) Date of Patent: Jul. 1, 2025

(54) SYSTEMS AND METHODS FOR FOCUSED USER ACCOUNT INBOXES

(71) Applicant: YAHOO ASSETS LLC, New York, NY (US)

(72) Inventors: Bassem Bouguerra, Long Beach, CA (US); Kevin Patel, Fremont, CA (US); Shashank Khanna, San Jose, CA (US); Shiv Shankar Sahadevan, San Jose, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/476,414

(22) Filed: Sep. 28, 2023

(65) Prior Publication Data

US 2024/0356880 A1    Oct. 24, 2024

Related U.S. Application Data

(60) Provisional application No. 63/497,944, filed on Apr. 24, 2023.

(51) Int. Cl.
| | |
|---|---|
| *H04L 51/214* | (2022.01) |
| *G06F 16/34* | (2025.01) |
| *G06F 40/166* | (2020.01) |
| *G06F 40/20* | (2020.01) |
| *G06F 40/205* | (2020.01) |
| *G06F 40/30* | (2020.01) |
| *G06F 40/40* | (2020.01) |
| *G06Q 10/1093* | (2023.01) |

(Continued)

(52) U.S. Cl.
CPC .......... *H04L 51/214* (2022.05); *G06F 16/345* (2019.01); *G06F 40/166* (2020.01); *G06F 40/20* (2020.01); *G06F 40/205* (2020.01); *G06F 40/30* (2020.01); *G06F 40/40* (2020.01); *G06Q 10/1095* (2013.01); *H04L 51/02* (2013.01); *H04L 51/04* (2013.01); *H04L 51/046* (2013.01); *H04L 51/216* (2022.05); *H04L 51/42* (2022.05); *H04W 4/02* (2013.01)

(58) Field of Classification Search
CPC ..... H04L 51/42; H04L 51/212; H04L 51/063; H04L 51/222; H04L 67/535; G06Q 10/107; G06Q 30/0269; G06Q 30/0244; G06Q 30/0255; G06Q 30/0256; G06Q 30/0261
See application file for complete search history.

(56) References Cited

U.S. PATENT DOCUMENTS

| | | | |
|---|---|---|---|
| 5,999,932 A | * 12/1999 | Paul | ............... H04L 51/212 |
| 7,831,676 B1 | * 11/2010 | Nagar | ............. G06Q 10/107 |
| | | | 709/224 |

(Continued)

*Primary Examiner* — Alex Tran
(74) *Attorney, Agent, or Firm* — James J. DeCarlo; Greenberg Traurig, LLP

(57) ABSTRACT

In some implementations, the techniques described herein relate to a method including: (i) accessing, by a processor, a plurality of messages for a user, (ii) analyzing, by a large language model executed by the processor, the plurality of messages to extract a context of each message, (iii) determining, by the processor, a current context of interest to the user, (iv) identifying, by the processor, a subset of the plurality of messages that each comprises a context related to the current context of interest to the user, and (v) causing display, by the processor, of the subset of the plurality of messages in a digital message inbox.

20 Claims, 5 Drawing Sheets

(51) Int. Cl.
  *H04L 51/02*   (2022.01)
  *H04L 51/04*   (2022.01)
  *H04L 51/046*  (2022.01)
  *H04L 51/216*  (2022.01)
  *H04L 51/42*   (2022.01)
  *H04W 4/02*    (2018.01)

(56) References Cited

U.S. PATENT DOCUMENTS

| | | | |
|---|---|---|---|
| 8,918,466 B2* | 12/2014 | Yu | H04L 51/212 |
| | | | 709/206 |
| 10,257,127 B2* | 4/2019 | Dotan-Cohen | G06Q 10/1093 |
| 11,228,659 B2* | 1/2022 | Podduturi | H04L 67/306 |
| 11,574,371 B1* | 2/2023 | Hosseini | G06Q 30/0269 |
| 11,886,826 B1* | 1/2024 | Bavarian | G06F 40/253 |
| 11,922,094 B2* | 3/2024 | Cardel Molina | G06F 16/26 |
| 11,962,546 B1* | 4/2024 | Hattangady | H04L 51/216 |
| 2013/0332551 A1* | 12/2013 | Hardy | G06Q 10/107 |
| | | | 709/206 |
| 2017/0034101 A1* | 2/2017 | Kumar | H04L 51/52 |
| 2023/0367960 A1* | 11/2023 | Smus | G06F 40/166 |

* cited by examiner

SYSTEMS AND METHODS FOR FOCUSED USER ACCOUNT INBOXES

CROSS-REFERENCE TO RELATED APPLICATIONS

This application claims the benefit of Provisional Patent Application No. 63/497,944, filed on Apr. 24, 2023, which is hereby incorporated by reference in its entirety.

BACKGROUND

Managing an email account is a difficult problem. The average user receives hundreds of emails per day, many of which are irrelevant to the user and have no beneficial impact on the user experience. These extraneous emails may create a time sink for first determining the contents of a message, determining the applicability of the message, and finally deciding whether the message requires further action. Accordingly, the instant disclosure describes a system and method for a focused inbox of a user account.

DETAILED DESCRIPTION

Figure 1:
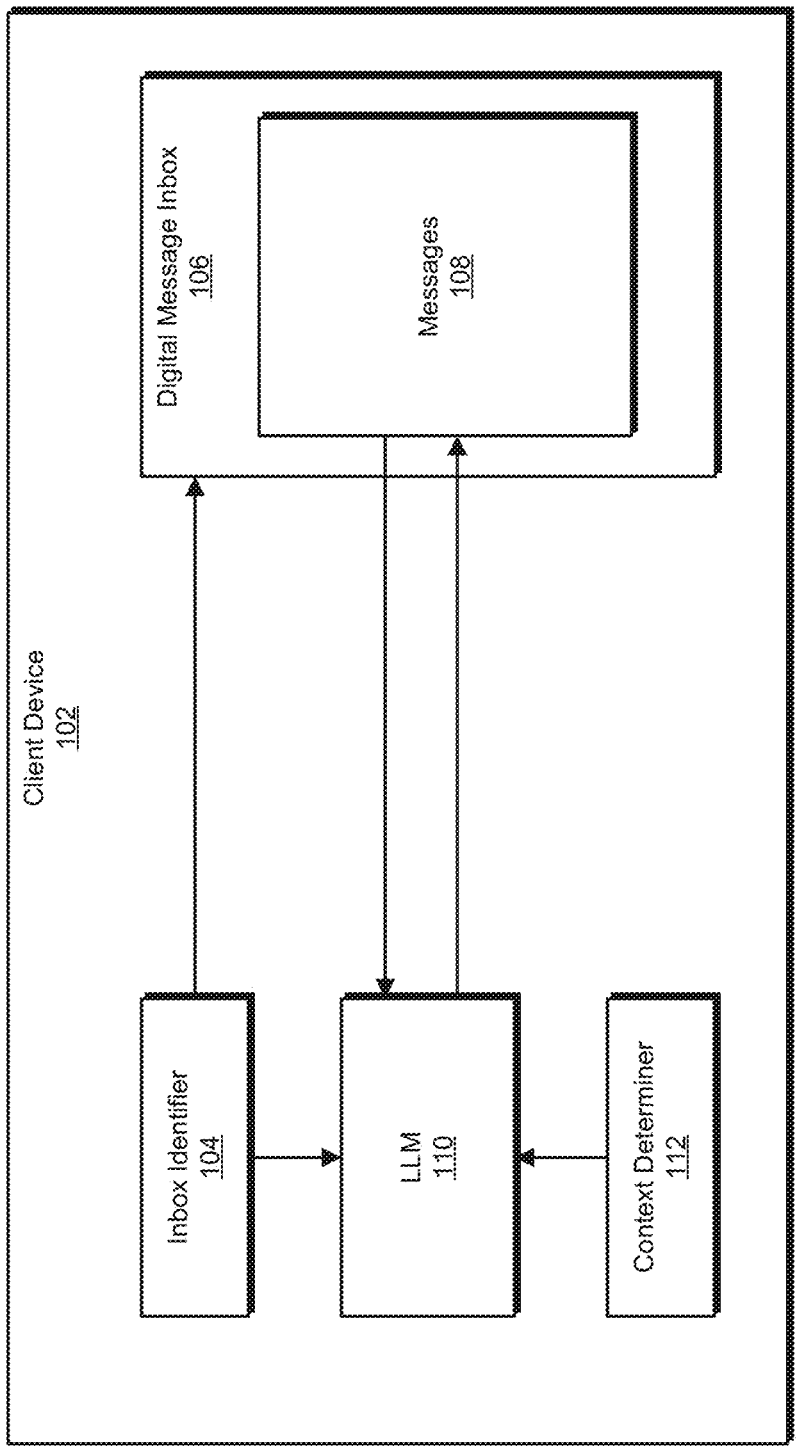
FIG. 1 is a block diagram illustrating a system for providing focused user account inboxes according to some of the example embodiments.

Various machine learning (ML) and artificial intelligence (AI) models are capable of analyzing and/or generating text. One example of such a model is a large language model (LLM). An LLM is a statistical model that predicts the next word in a sequence, given the previous words (often referred to as a "prompt"). LLMs are trained on massive datasets of text, and can be used for a variety of tasks, such as text generation, translation, and question answering. LLMs are typically composed of a neural network with many parameters (typically billions of weights or more). The neural network is trained on a large dataset of text and learns to predict the next word in a sequence, given the previous words. While LLMs are used primarily in the following description, the embodiments described herein can apply equally to other types of text generation models including, but not limited to, long short-term memory (LSTM) models, recurrent neural networks (RNNs), encoder-decoder models, transformer-based models, specialized convolutional neural networks (CNNs) and the like.

The example embodiments herein describe methods, computer-readable media, devices, and systems that create a focused message inbox for a user account by analyzing messages with an LLM, detecting the user's current context, and surfacing messages most relevant to the current context based on the outputs of the LLM. For example, the disclosed systems and methods may surface bills on the day the bills are due, or flag messages related to children's activities while at a school. In some implementations, the LLM can also summarize the contents of messages.

In some implementations, the techniques described herein relate to a method including: (i) accessing, by a processor, a plurality of messages for a user, (ii) analyzing, by a large language model executed by the processor, the plurality of messages to extract a context of each message, (iii) determining, by the processor, a current context of interest to the user, (iv) identifying, by the processor, a subset of the plurality of messages that each comprises a context related to the current context of interest to the user, and (v) causing display, by the processor, of the subset of the plurality of messages in a digital message inbox.

In some implementations, the techniques described herein relate to a method, wherein determining, by the processor, the current context of interest to the user includes receiving text input from the user specifying the current context of interest.

In some implementations, the techniques described herein relate to a method, wherein receiving the text input from the user includes parsing the text input from the user via the large language model to determine the current context of interest.

In some implementations, the techniques described herein relate to a method, wherein receiving the text input from the user includes capturing audio input from the user and parsing the audio input into the text input.

In some implementations, the techniques described herein relate to a method, wherein determining, by the processor, the current context of interest to the user includes determining the current context of interest based on a current time period.

In some implementations, the techniques described herein relate to a method, wherein determining, by the processor, the current context of interest to the user includes identifying a current location of a device operated by the user to display the digital message inbox and determining the current context based on the current location of the device.

In some implementations, the techniques described herein relate to a method, wherein displaying, by the processor, in the digital message inbox, the subset of the plurality of messages includes creating, by the large language model executed by the processor, a summary of at least one message in the subset and displaying the summary in the digital message inbox.

In some implementations, the techniques described herein relate to a non-transitory computer-readable storage medium for tangibly storing computer program instructions capable of being executed by a computer processor, the computer program instructions defining steps of: (i) accessing, by a processor, a plurality of messages for a user, (ii) analyzing, by a large language model executed by the processor, the plurality of messages to extract a context of each message, (iii) determining, by the processor, a current context of interest to the user, (iv) identifying, by the processor, a subset of the plurality of messages that each comprises a context related to the current context of interest to the user, and (v) causing display, by the processor, of the subset of the plurality of messages in a digital message inbox.

In some implementations, the techniques described herein relate to a non-transitory computer-readable storage medium, wherein determining, by the processor, the current context of interest to the user includes receiving text input from the user specifying the current context of interest.

In some implementations, the techniques described herein relate to a non-transitory computer-readable storage medium, wherein receiving the text input from the user includes parsing the text input from the user via the large language model to determine the current context of interest.

In some implementations, the techniques described herein relate to a non-transitory computer-readable storage medium, wherein receiving the text input from the user includes capturing audio input from the user and parsing the audio input into the text input.

In some implementations, the techniques described herein relate to a non-transitory computer-readable storage medium, wherein determining, by the processor, the current context of interest to the user includes determining the current context of interest based on a current time period.

In some implementations, the techniques described herein relate to a non-transitory computer-readable storage medium, wherein determining, by the processor, the current context of interest to the user includes identifying a current location of a device operated by the user to display the digital message inbox and determining the current context based on the current location of the device.

In some implementations, the techniques described herein relate to a non-transitory computer-readable storage medium, wherein displaying, by the processor, in the digital message inbox, the subset of the plurality of includes creating, by the large language model executed by the processor, a summary of at least one message in the subset and displaying the summary in the digital message inbox.

In some implementations, the techniques described herein relate to a device including: a processor; and a storage medium for tangibly storing thereon logic for execution by the processor, the logic including instructions for: (i) accessing, by a processor, a plurality of messages for a user, (ii) analyzing, by a large language model executed by the processor, the plurality of messages to extract a context of each message, (iii) determining, by the processor, a current context of interest to the user, (iv) identifying, by the processor, a subset of the plurality of messages that each comprises a context related to the current context of interest to the user, and (v) causing display, by the processor, of the subset of the plurality of messages in a digital message inbox.

In some implementations, the techniques described herein relate to a device, wherein determining, by the processor, the current context of interest to the user includes receiving text input from the user specifying the current context of interest.

In some implementations, the techniques described herein relate to a device, wherein receiving the text input from the user includes parsing the text input from the user via the large language model to determine the current context of interest.

In some implementations, the techniques described herein relate to a device, wherein receiving the text input from the user includes capturing audio input from the user and parsing the audio input into the text input.

In some implementations, the techniques described herein relate to a device, wherein determining, by the processor, the current context of interest to the user includes determining the current context of interest based on a current time period.

In some implementations, the techniques described herein relate to a device, wherein determining, by the processor, the current context of interest to the user includes identifying a current location of a device operated by the user to display the digital message inbox and determining the current context based on the current location of the device.

FIG. 1 is a block diagram illustrating a system for focused user account inboxes according to some of the example embodiments.

The illustrated system includes a client device 102. Client device 102 may include an inbox identifier 104 that identifies a digital message inbox 106 that includes a plurality of messages 108. A processor of client device 102 may execute or otherwise be in communication with an LLM 110 that analyzes messages 108 to extract a context from each message. A context determiner 112 may determine a current context of interest to the user (e.g., as described below in connection with step 206 of FIG. 2) and provide this context to LLM 110 which may identify and forward for display in the digital message inbox a subset of messages 108 that each includes a context that matches the current context of interest to the user while avoiding displaying messages outside the subset. Although illustrated here on client device 102, any or all of the systems described herein may be hosted by one or more servers and/or cloud based processing resources. Further details of these components are described herein and in the following flow diagrams.

In the various implementations, client device 102, inbox identifier 104, LLM 110, and/or context determiner 112 can be implemented using various types of computing devices such as laptop/desktop devices, mobile devices, server computing devices, etc. Specific details of the components of such computer devices are provided in the description of FIG. 5 which are not repeated herein. In general, these devices can include a processor and a storage medium for tangibly storing thereon logic for execution by the processor. In some implementations, the logic can be stored on a non-transitory computer readable storage medium for tangibly storing computer program instructions. In some implementations, these instructions can implement some of all of the methods described in FIG. 2 and FIG. 4.

In some implementations, digital message inbox 106 may include an email inbox and messages 108 may include emails. Additionally, or alternatively, digital message inbox 106 may include an instant message inbox and messages 108 may include instant messages. In one implementation, digital message inbox 106 may include a text message inbox and messages 108 may include text messages (e.g., short messaging service messages).

Figure 2:
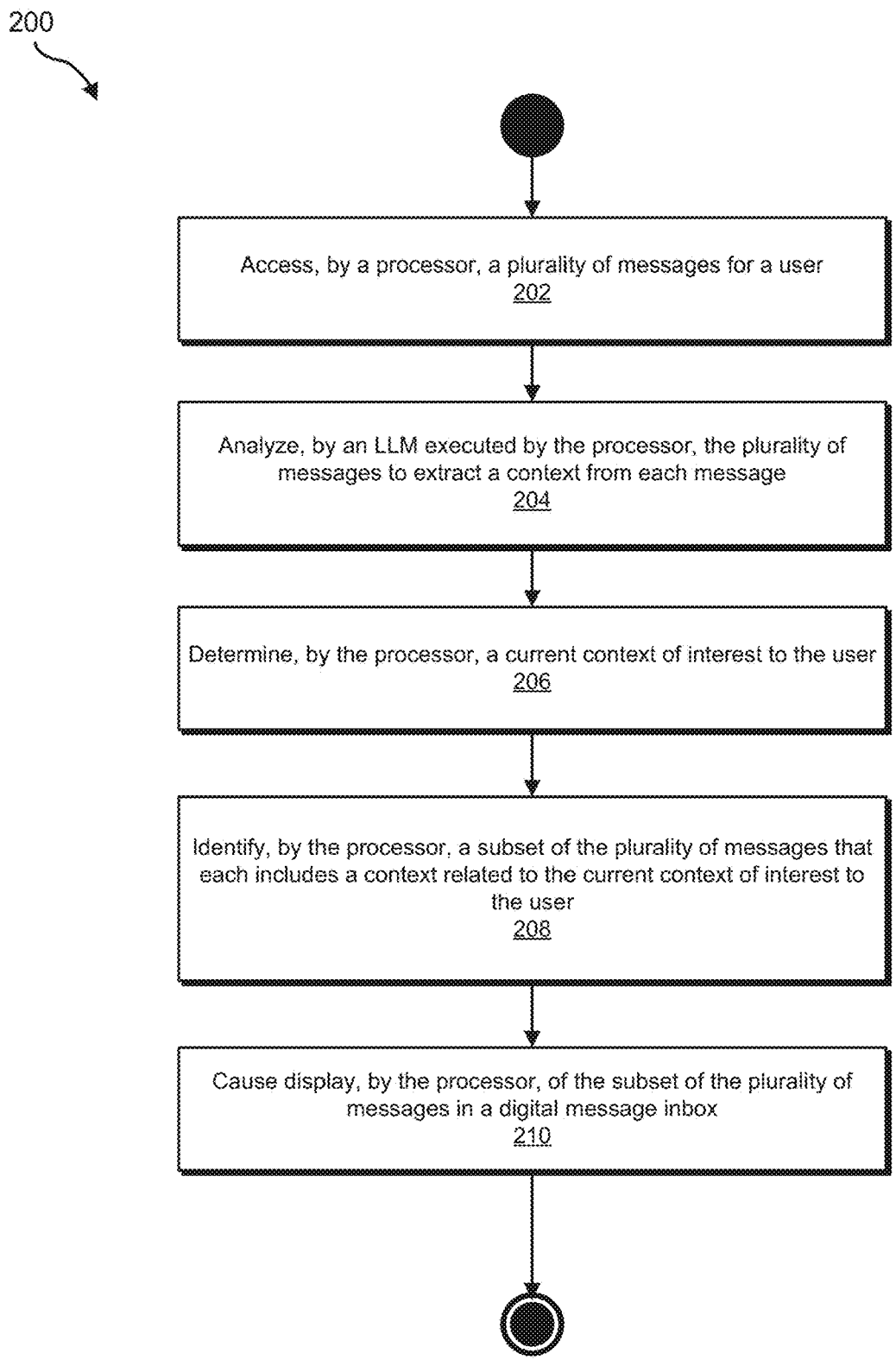
FIG. 2 is a flow diagram illustrating a method for providing focused user account inboxes according to some of the example embodiments.

FIG. 2 is a flow diagram illustrating a method for focused user account inboxes according to some of the example embodiments.

In step 202, the method can include accessing, by a processor, a plurality of messages for a user.

In some implementations, the method may include identifying or otherwise accessing messages in the digital message inbox as messages arrive. Additionally or alternatively, the method may identify or access messages for analysis at set intervals (e.g., every minute, every ten minutes, every hour, etc.). In one implementation, the method may identify or access messages in the digital message inbox when a session with the digital message inbox is initiated by a user (e.g., when the user opens a messaging app).

In step 204, the method can include analyzing, by an LLM executed by the processor, the plurality of messages to extract a context from each message.

In some implementations, a context may include a topic and/or general category of a message. For example, a context may include a category such as bills, children's activities, work, hobby activities, and so forth. Additionally, a context may include details such as a relevant time or location. For example, a message may have a context of the "bill" category and a relevant time that is the due date of the bill. In another example, a message may have the context of "work" and a relevant time of weekdays between 9 AM and 5 PM.

In some implementations, a context may be a default context preloaded into the systems described herein such as "work" or "bills." Additionally, or alternatively, a context may be specified by a user, such as "children's activities," "archery," or "shopping" or time periods such as a defined date and/or time range. In some implementations, a context may be dynamically derived by the method. For example, an LLM may analyze the messages in the digital message inbox, discover a common topic of the messages, and create a context from the topic such as "upcoming vacation" or "wedding planning."

In some implementations, the method may parse the messages to format the messages as input for the LLM. For example, the method may build a prompt for the LLM using the digital message inbox as the content. In one example, the method may provide a prompt for each message, such as, "Read the following email and provide a context, selecting from the following list of contexts: bills, shopping, children's activities, upcoming vacation, hiking, action items due within the next week, no matching context."

In step 206, the method can include determining, by the processor, a current context of interest to the user.

In some implementations, the method may receive input from the user and parse that input (e.g., via the LLM) to determine the current context. For example, a user may type, "show me messages about my kid's activities" and the LLM may parse this to determine the current context of interest is children's activities. In another example, a user may say, "show me messages about my kid's activities" and the method may capture the speech via a microphone or other audio sensor, parse the audio to extract the text of the speech, and then parse the text via the LLM.

In some embodiments, the method may parse text received from the user into a prompt before providing that prompt as input to the LLM.

Example user text: "show me messages about my kid's activities"

Example prompt: I want to see messages about activities for one or more of my children that will take place within one month of the current date, May 15$^{th}$. Please identify my context as an array of high-level words describing my state. Please limit the array to no more than four words.

In some examples, a user may specify context information to be used later. For example, a user may use a chat interface to specify "only allow notifications about billing from the power company on the billing due date" and the method may store this information to later identify and display relevant messages. In one example, a user may enter the time periods or time windows in which they work, such as 9 AM to 5 PM on weekdays and the method may store this information to avoid displaying messages with the work context outside of that window, analyze such messages for urgency before displaying only urgent messages, and/or auto-respond to messages with the work context received outside work hours.

Additionally or alternatively, the method may determine the context based on the location of the user (e.g., via a location sensor in a mobile device operated by the user), the current date or time, and/or other information about the user's state. For example, if the user is at an elementary school, the method may determine that the current context of interest is children's activities. In another example, if the date matches the due date of a bill referred to in a message, the method may determine that the current context includes bills due today. In one example, if the current time is not during work hours, the method may determine that the current context of interest does not include the work context.

In another example, if the user has recently selected two messages related to shopping discounts from the digital message inbox, the method may determine that the current context of interest is shopping and may prompt the user to switch the digital message inbox to only show messages relevant to shopping.

In some implementations, the method may determine the context based on additional digital information about the user. For example, the method may take a digital calendar as input. In one example, the method may identify a digital calendar event for today that is a school book fair and may determine, based on this event, that the current context of interest includes children's activities. In another example, the method may take a digital to-do list as input. For example, the method may identify a to-do list item of "pay bills" on today's to-do list and may determine that the current context of interest includes bills due within the next week.

Steps 206 and 204 may be performed in any order. For example, in one implementation, the method may first determine a current context of interest of the user and then may analyzes messages to determine of any messages are related to the current context of interest. For example, the method may determine that the current context of interest is shopping and may provide a prompt to the LLM such as, "My context is shopping. Please read each message in the inbox and respond YES if the message relates to the context of shopping and NO if the message does not relate to the context of shopping."

In step 208, the method can include identifying, by the processor, a subset of the plurality of messages that each includes a context related to the current context of interest to the user.

The method may determine that the context of the message is related to the current context of interest to the user in a variety of ways. For example, the method may determine that the context of the message matches the current context of interest. In one example, the method may determine that the context of the message is "children's activities" and the current context of interest is also "children's activities." In other examples, the method may determine that the context is related by providing the context of the message and the current context of interest to an algorithm (e.g., a machine learning model, the LLM, etc.) that determines whether the two are related. In some examples, a message context may be related if it is a subset of the current context of interest. For example, a message with the context of "bills due on May 15$^{th}$" may be related to a current context of interest of "action items due on May 15$^{th}$" and a current context of interest of "bills."

In some implementations, the LLM may identify the subset of the messages. For example, the LLM may identify one or more contexts for each message and may tag each message with the relevant context or contexts and the method may identify messages with tags matching the current context of interest.

In some implementations, the method may identify multiple current contexts of interest and multiple subsets. For example, the method may identify that the user is currently at a school and thus likely interested in the children's activities context but that the user's mortgage payment is due today and therefore the user is likely also interested in seeing messages in the bill's context with a due date of today. In other implementations, the method may only identify a subset of messages that match a single context rated as the highest level of current interest to the user. For example, the method may suppress messages about bills due today and surface only messages related to children's activities when at a school.

In some implementations, the method may identify other priority signals related to messages. For example, the method may always determine that messages flagged as "high priority" are relevant to the current context of interest regardless of the current context of interest. In another example, the method may determine that messages manually tagged as to-do list items by the user are always relevant to the current context of interest.

In step 210, the method can include causing display, by the processor, of the subset of the plurality of messages in a digital message inbox.

In some implementations, the method may cause the display of the subset by transmitting information about the subset. For example, the processor may be located on a server and may transmit information about the subset to a client device (e.g., a mobile device) that displays the digital message inbox. In another implementation, the method may cause the display of the subset by interfacing with a messaging application. For example, the processor may be located on a mobile device and may direct the messaging application on the mobile device to display the subset of messages in the digital message inbox.

In one implementation, the method may display the subset by avoiding displaying messages outside the subset. For example, the method may display the subset in a separate portion of the digital message inbox (e.g., a "priority" tab) that does not display all of the messages in the digital message inbox. In another example, the method may hide messages that are not part of the subset from being displayed in the main digital message inbox. For example, the method may display the messages that are part of the subset and may display a user interface element reading, "click to see more messages" that initiates display of the remaining messages when interacted with by the user. Alternatively, the method may display the subset alongside messages outside of the subset but emphasized visually in some way. For example, messages in the subset may be highlighted in a different color. In one example, messages in the subset may be bolder and/or displayed in a larger font size compared to messages not in the subset. Additionally, or alternatively, the method may display messages in the subset at the top of the inbox, above messages not in the subset.

In some implementations, the method may format the messages for display. For example, the LLM and/or a parser attached to the LLM may output a JavaScript Object Notation (JSON) structure that can be used to build a user interface for the digital message inbox.

Figure 3:
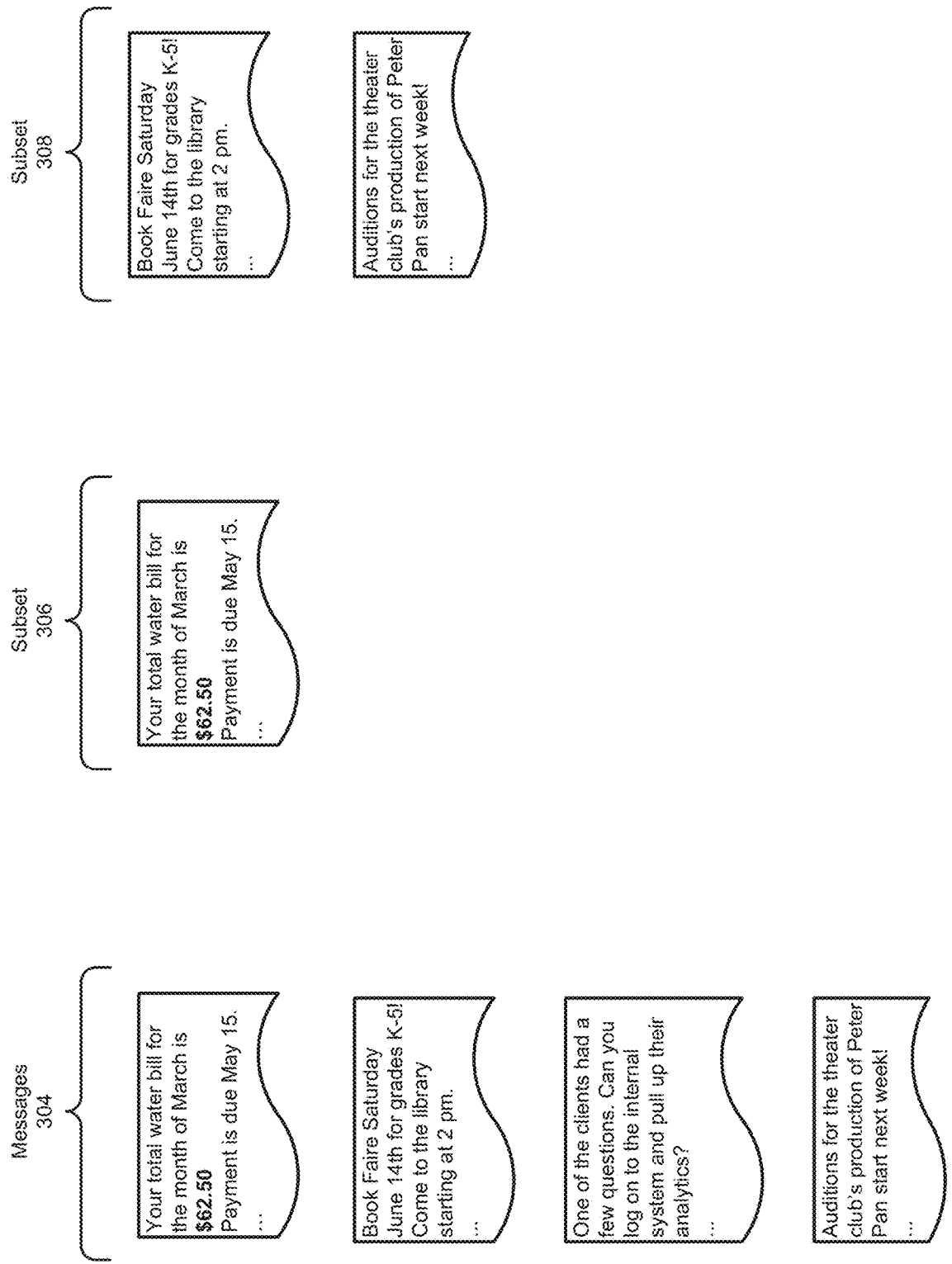
FIG. 3 is an illustration of example messages in a focused user account inbox according to some of the example embodiments.

FIG. 3 is an illustration of example messages sorted into focused user account inboxes in different contexts according to some of the example embodiments.

In one example, messages 304 may represent the current contents of a digital message inbox that includes messages about work, bills, and children's activities. In one example, the current time may include the date May 15$^{th}$ and thus the current context of interest to the user may include things with an action date of May 15$^{th}$, such as bills due on May 15$^{th}$, emails that need to be responded to by May 15$^{th}$, and so forth. In this example, the method may identify a subset 306 that includes a message about the water bill due on May 15$^{th}$. In another example, the method may identify that the user's location is at an elementary school and thus the current context of interest is children's activities. In this example, the method may identify a subset 308 that includes two messages relevant to children's activities.

Example Prompt: The date is May 15. It is 12:05. I'm currently at Hamilton Park Montessori School. I have an event right now entitled "School Play." My phone is currently silencing non-critical notifications and I have my ringer off. I have preferences for these topics: Bills, Emergencies, Flash Sales. Please identify my context as an array of high-level words describing my state. Please limit the array to no more than four words.

Filtering Prompt: Given the previous context, please rank each of the following messages as whether they are related to my context terms:
1. Your total water bill for the month of March is $62.50 Payment is due May 15.
2. Book Faire Saturday June 14th for grades K-5! Come to the library starting at 2 pm.
3. One of the clients had a few questions. Can you log on to the internal system and pull up their analytics?
4. Auditions for the theater club's production of Peter Pan start next week!

Please return only a JSON mapping of number ("1") to a boolean value (i.e., true if related).

Figure 4:
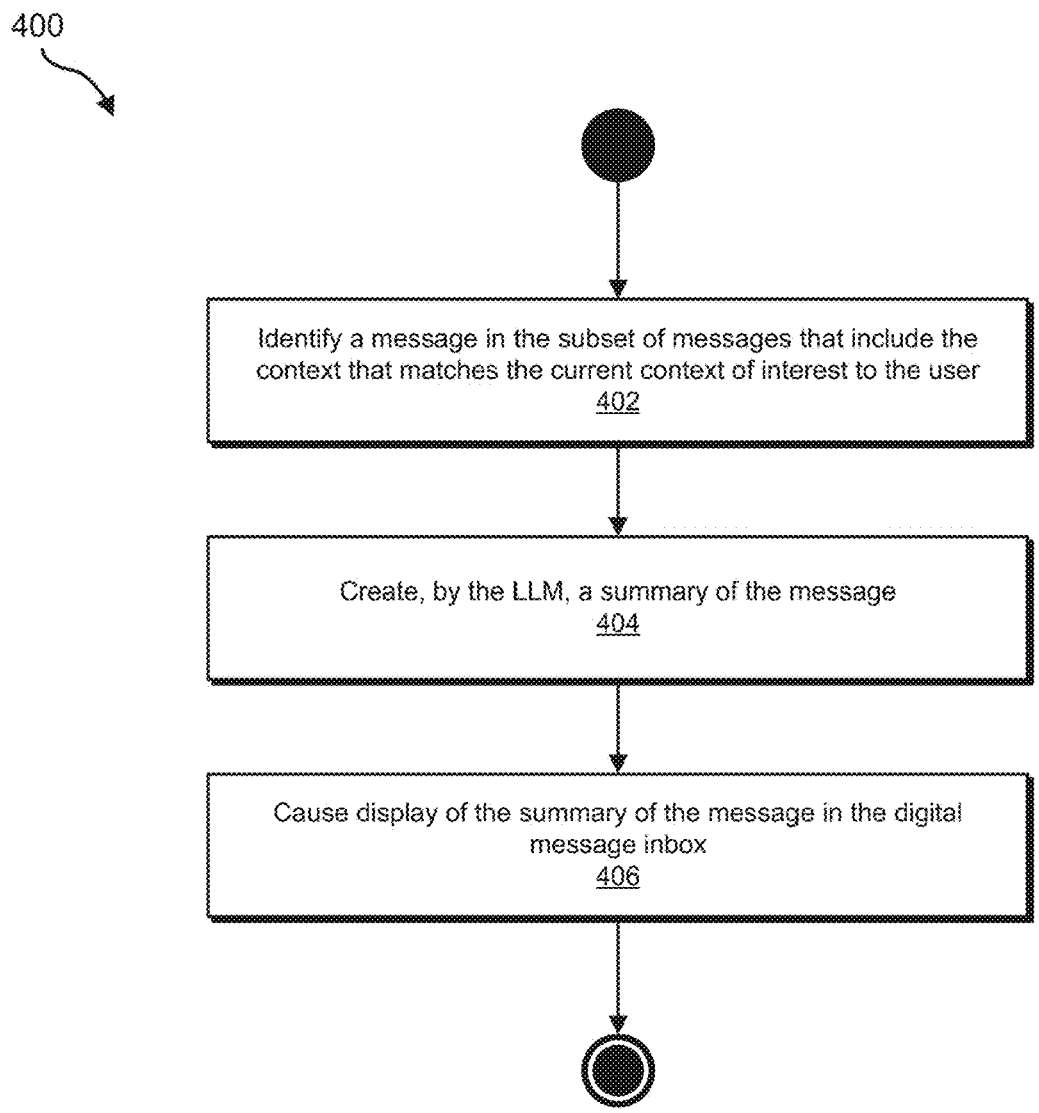
FIG. 4 is a flow diagram illustrating a method providing focused user account inboxes with message summaries according to some of the example embodiments.

FIG. 4 is a flow diagram illustrating a method for focused user account inboxes with message summaries according to some of the example embodiments.

In step 402, the method can include identifying a message in the subset of messages that include the context that matches the current context of interest to the user.

In some implementations, the method may create a summary of every message in the subset. Alternately, the method may only create a summary of some messages. For example, the method may identify a message selected by the user and may create a summary in response to identifying that the message is being selected. In another example, the method may identify messages with certain characteristics, such as messages over a certain length, messages that contain a certain percentage of text (as opposed to, e.g., images), and so forth.

In step 404, the method may include creating, by the LLM, a summary of the message.

The LLM may summarize the message in a variety of ways. For example, the LLM may create a summary that follows certain constraints, such as being less than a certain number of words or characters. In another implementation, the LLM may create a summary with a length dependent upon the length and/or complexity of the message. In some implementations, the LLM may create a natural language summary. Additionally or alternatively, the LLM may create a summary that consists of bullet points and/or keywords.

Example message: Your water bill is due on Monday, May 15$^{th}$. Payment may be made over the phone by credit card, via the website by credit card or ACH transfer, or by mailing a check. To set up auto-pay, visit the website and navigate to the "payments" tab. Any payment after the due date will incur a late fee of $5 per week. Your current bill total is $62.50. This covers the period from March 1 through March 31. On average, you used more water this year than for the same month last year. Compared to neighbors with similar houses, you used about the same amount of water. For more usage details as well as tips and tricks for reducing your water usage, navigate to the website and select the "My usage details" tab of the "account details" page. To receive paper copies of your water statement, navigate to "my statement settings" on the website and select "receive paper statements."

Example prompt: Create a summary of the above message that is no more than 30 words long. Be sure to include any due dates or numeric amounts. The summary should be in natural language and use short sentences.

Example summary: Your water bill of $62.50 is due on May 15$^{th}$. If not paid on time, late fees are $5/week. Check the website for water usage details.

In step 406, the method may include causing display of the summary of the message in the digital message inbox.

In some implementations, the method may display the summary of the message as part of a preview of the message. Additionally or alternatively, the method may replace the contents of the message with the summary of the message in a user interface of the digital message inbox. In one implementation, the summaries may be displayed in the normal digital message inbox user interface. For example, the method pay pin the summaries to the top of the inbox (e.g., until the messages are read, for a preset time such as one day, until the context changes, etc.). Additionally, or alternately, the method may display the summaries in a dedicated page on the user interface. In one implementation, the method may send one or more summaries as push notifications.

In some embodiments, the method may recommend responses and/or actions based on the content of the displayed messages. For example, if the displayed message is a bill reminder, the method may generate a link to an online bill pay system relevant to the bill. In another example, if the message is about an upcoming event, the method may prompt the user to create a calendar reminder for the event. In one implementation, the LLM may output the recommended action based on the context and/or content of the message. For example, the LLM may take the content of the message as input (e.g., as a part of a prompt) and may then output a suggested action formatted to be transformed into a user interface element (e.g., the LLM may output JSON).

Figure 5:
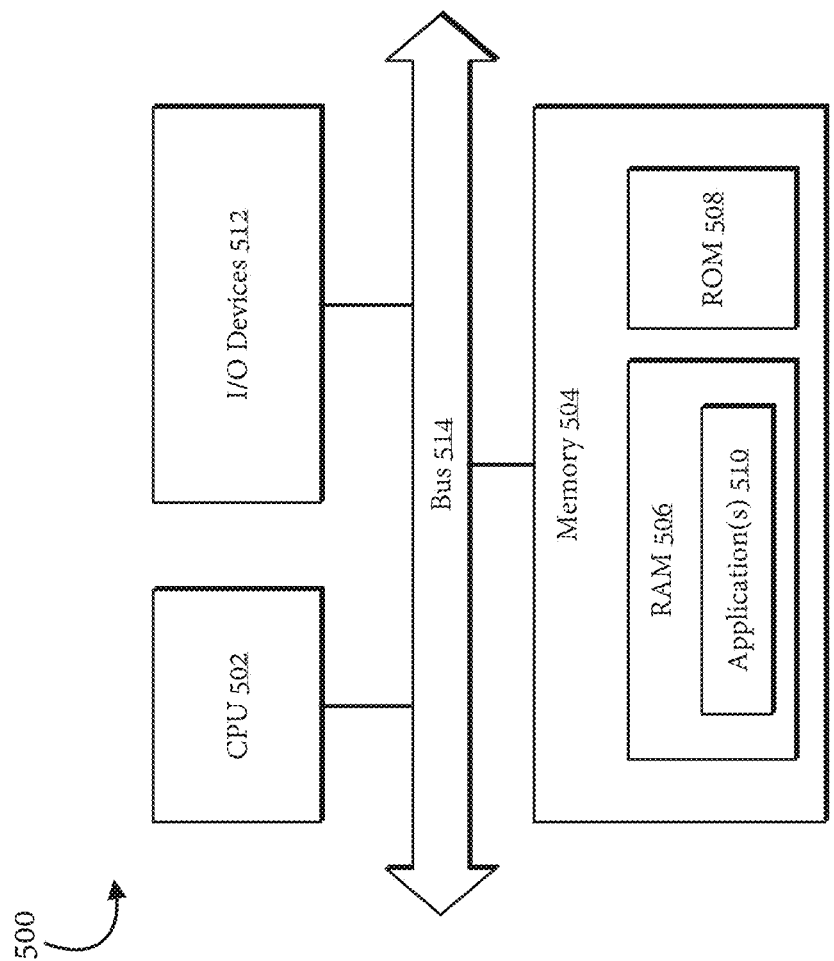
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:
   accessing, by a processor, a plurality of messages for a user;
   analyzing, by a large language model executed by the processor, the plurality of messages to extract a context of each message, a given context comprising a topic of a corresponding message and one or more of a time and location associated with the corresponding message;
   automatically determining, by the processor, a current context of interest to the user based on user data comprising at least one of a current location of a device operated by the user, a current time period, or a digital calendar event by inputting the user data into the large language model;
   identifying, by the processor, a subset of the plurality of messages that each comprises a context related to the current context of interest to the user;
   creating, by the large language model executed by the processor, a summary of at least one message in the subset; and
   causing display, by the processor, of the subset of the plurality of messages and the summary in a digital message inbox, wherein messages outside the subset are not displayed.

2. The method of claim 1, wherein determining, by the processor, the current context of interest to the user comprises receiving text input from the user specifying the current context of interest.

3. The method of claim 2, wherein receiving the text input from the user comprises parsing the text input from the user via the large language model to determine the current context of interest.

4. The method of claim 2, wherein receiving the text input from the user comprises capturing audio input from the user and parsing the audio input into the text input.

5. The method of claim 1, wherein determining, by the processor, the current context of interest to the user comprises determining the current context of interest based on a current time period.

6. The method of claim 1, wherein determining, by the processor, the current context of interest to the user comprises:
   identifying a current location of a device operated by the user to display the digital message inbox; and
   determining the current context based on the current location of the device.

7. The method of claim 1, further comprising: generating a recommendation for an action based on content of at least one message in the subset of the plurality of messages; and displaying the recommendation along with the subset of the plurality of messages in the digital message inbox.

8. The method of claim 1, further comprising: identifying multimedia content within at least one message in the subset of the plurality of messages; generating a textual description of the multimedia content; and including the textual description in the summary of the at least one message.

9. A non-transitory computer-readable storage medium for tangibly storing computer program instructions capable of being executed by a computer processor, the computer program instructions defining steps of:
   accessing, by a processor, a plurality of messages for a user;
   analyzing, by a large language model executed by the processor, the plurality of messages to extract a context of each message, a given context comprising a topic of a corresponding message and one or more of a time and location associated with the corresponding message;
   automatically determining, by the processor, a current context of interest to the user based on user data comprising at least one of a current location of a device operated by the user, a current time period, or a digital calendar event by inputting the user data into the large language model;
   identifying, by the processor, a subset of the plurality of messages that each comprises a context related to the current context of interest to the user;

creating, by the large language model executed by the processor, a summary of at least one message in the subset; and causing display, by the processor, of the subset of the plurality of messages and the summary in a digital message inbox, wherein messages outside the subset are not displayed.

10. The non-transitory computer-readable storage medium of claim 9, wherein determining, by the processor, the current context of interest to the user comprises receiving text input from the user specifying the current context of interest.

11. The non-transitory computer-readable storage medium of claim 10, wherein receiving the text input from the user comprises parsing the text input from the user via the large language model to determine the current context of interest.

12. The non-transitory computer-readable storage medium of claim 10, wherein receiving the text input from the user comprises capturing audio input from the user and parsing the audio input into the text input.

13. The non-transitory computer-readable storage medium of claim 9, wherein determining, by the processor, the current context of interest to the user comprises determining the current context of interest based on a current time period.

14. The non-transitory computer-readable storage medium of claim 9, wherein determining, by the processor, the current context of interest to the user comprises:

identifying a current location of a device operated by the user to display the digital message inbox; and determining the current context based on the current location of the device.

15. A device comprising:

a processor; and a storage medium for tangibly storing thereon logic for execution by the processor, the logic comprising instructions for:

accessing, by the processor, a plurality of messages for a user;

analyzing, by a large language model executed by the processor, the plurality of messages to extract a context of each message, a given context comprising a topic of a corresponding message and one or more of a time and location associated with the corresponding message;

automatically determining, by the processor, a current context of interest to the user based on user data comprising at least one of a current location of a device operated by the user, a current time period, or a digital calendar event by inputting the user data into the large language model;

identifying, by the processor, a subset of the plurality of messages that each comprises a context related to the current context of interest to the user;

creating, by the large language model executed by the processor, a summary of at least one message in the subset; and causing display, by the processor, of the subset of the plurality of messages and the summary in a digital message inbox, wherein messages outside the subset are not displayed.

16. The device of claim 15, wherein determining, by the processor, the current context of interest to the user comprises receiving text input from the user specifying the current context of interest.

17. The device of claim 16, wherein receiving the text input from the user comprises parsing the text input from the user via the large language model to determine the current context of interest.

18. The device of claim 16, wherein receiving the text input from the user comprises capturing audio input from the user and parsing the audio input into the text input.

19. The device of claim 15, wherein determining, by the processor, the current context of interest to the user comprises determining the current context of interest based on a current time period.

20. The device of claim 15, wherein determining, by the processor, the current context of interest to the user comprises:

identifying a current location of a device operated by the user to display the digital message inbox; and determining the current context based on the current location of the device.

* * * * *